(12) United States Patent
Trauger et al.

(10) Patent No.: US 7,419,593 B2
(45) Date of Patent: Sep. 2, 2008

(54) BIOREMEDIATION MAT AND METHOD OF MANUFACTURE AND USE

(75) Inventors: Robert J. Trauger, Cary, IL (US); James T. Olsta, Bartlett, IL (US); Charles J. Hornaday, Arlington Heights, IL (US); Jerald W. Darlington, Jr., Marengo, IL (US)

(73) Assignee: AMCOL International Corp., Arlington Heights, IL (US)

( * ) Notice: Subject to any disclaimer, the term of this patent is extended or adjusted under 35 U.S.C. 154(b) by 567 days.

(21) Appl. No.: 11/221,019

(22) Filed: Sep. 7, 2005

(65) Prior Publication Data
US 2006/0000767 A1 Jan. 5, 2006

Related U.S. Application Data

(63) Continuation-in-part of application No. 10/718,128, filed on Nov. 19, 2003, now abandoned.

(51) Int. Cl.
*B01D 39/02* (2006.01)
*B01D 39/04* (2006.01)
*B01D 39/06* (2006.01)
*B01D 39/00* (2006.01)

(52) U.S. Cl. .................. 210/502.1; 210/503; 210/601; 210/610; 210/901; 210/634; 156/62.2

(58) Field of Classification Search .................. None
See application file for complete search history.

(56) References Cited

U.S. PATENT DOCUMENTS 4,165,281 A 8/1979 Kuriyama et al.
(Continued)

FOREIGN PATENT DOCUMENTS

FR 2 639 342 * 11/1988
(Continued)

OTHER PUBLICATIONS

Lorah et al., "Development and Performance Monitoring of a Dechlorinating Culture and an Innovative Bioremediation Remedy at the Ground Water/Surface-Water Interface," Groundwater/Porewater/Surfacewater Interactions (Platform Papers).
(Continued)

*Primary Examiner*—Krishnan S Menon
(74) *Attorney, Agent, or Firm*—Marshall, Gerstein & Borun LLP

(57) ABSTRACT

Bioremediation geocomposite articles, and their method of manufacture, for treating (digesting) contaminats in soil or water. The bioremediating geocomposite mat includes a woven or non-woven geotexile, having a thickness of about 6 mm to about 200 mm. In the preferred embodiment, outer layers of the geocomposite article have a porosity sufficient to receive a powdered or granular contaminant-reactive material, contaminat-sorptive material, or a contaminant-neutralizing material in at least outer portions of the thickness across its entire major surface(s) for better contact of the bacteria with contaminants held by the powdered or granular material. In the most preferred embodiment, liquid-permeable cover sheets are adhered to the upper and lower major surfaces of the bacterial-containing geotextile article to prevent a powdered or granular material from escaping from the geotextile during transportation and installation.

27 Claims, 4 Drawing Sheets

U.S. PATENT DOCUMENTS

| | | | |
|---|---|---|---|
| 5,043,076 | A | 8/1991 | Alexander |
| 5,237,945 | A | 8/1993 | White |
| 5,346,565 | A | 9/1994 | White |
| 5,900,085 | A | 5/1999 | Clarey et al. |
| 6,610,781 | B1 | 8/2003 | Zhou et al. |
| 7,128,498 | B2 | 10/2006 | Sheahan et al. |

FOREIGN PATENT DOCUMENTS

| | | |
|---|---|---|
| JP | 2002018422 | 1/2002 |
| JP | 2002153257 | 5/2002 |
| WO | WO-2005056286 | 6/2005 |

OTHER PUBLICATIONS

International Search Report for PCT/US2006/034951.

* cited by examiner

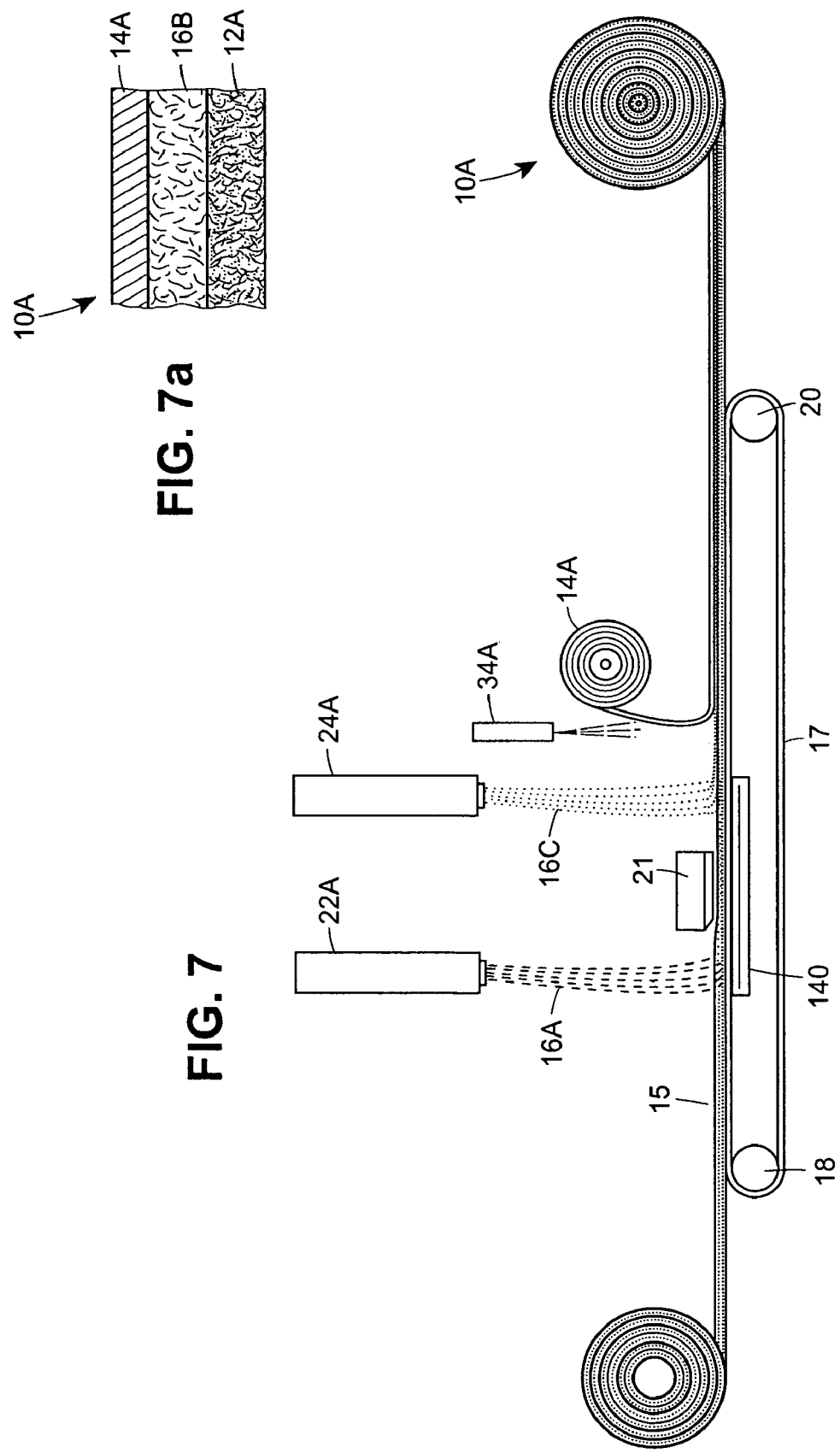

BIOREMEDIATION MAT AND METHOD OF MANUFACTURE AND USE

FIELD OF THE INVENTION

The present invention is directed to bioremediating geocomposite mats for controlling or preventing the further spread of contaminants in soil or water. More particularly, the bioremediation geocomposite mats described herein include a core formed from a geotextile that contains a bacteria capable of bioremediating (digesting) organic contaminants, and, optionally also contains a powdered or granular adsorbent, absorbent or reactive material, such as activated carbon, coke breeze, peat moss, polymeric ion exchange resins, polymeric adsorbing resins, zero-valent iron, apatite, organophilic clay, zeolite, diatomaceous earth or mixtures thereof. In a preferred embodiment, the bioremediation mats include a liquid-permeable cover sheet attached to the upper and lower major surfaces of the bacteria-containing geotextile mat.

BACKGROUND AND PRIOR ART

The prior art is replete with methods and articles used to confine or store a wide variety of environmental contaminants ranging from completely capping, in-situ, contaminated sediments that are left in-place in underwater environments; terrestrial landfills wherein dredged or otherwise collected contaminated sediments are placed within an engineered disposal site surrounded with an impervious liner system and capped with an impervious material; and the use of a reactive mat and/or reactive backfill that surrounds the contaminated material. Examples of reactive mats are found in U.S. Pat. No. 6,284,681 B1 ('681) and published application US 2002/0151241 A1 ('241). The reactive mats described in these two publications include one or more layers of reactive material each surrounded by geotextiles that allow contaminated liquid to pass through the reactive mat for sorption or reaction of the contaminant with a reactive material contained between the geotextile layers, and in the case of the '241 published application, the mat may be deployed vertically.

Others have injected contaminated soils with bacteria for contaminant digestion, as described in the following journals and articles: Soil & Sediment Contamination by Taylor & Francis, Inc., 325 Chestnut Street, Philadelphia, Pa. 19106; Welander, U., *Microbial Degradation of Organic Pollutants in Soil in a Cold Climate*, Soil & Sediment Contamination, 14:281-291, 2005; Karthikeyan, R. and Bhandari, A., *Anaerobic Biotransformation of Aromatic and Polycyclic Aromatic Hydrocarbons in Soil Microcosms: A Review*, Journal of Hazardous Substance Research, 3:1, 2001.

One of the major problems encountered with the use of reactive mats for controlling or confining contaminated materials, or in controlling or preventing leaching of contaminants from sediments and preventing the contaminants from entering ground water supplies, or from traversing through a lake/soil or ocean/soil interface into the lake or ocean, is in the ability to provide a transportable mat having a sufficient volume or thickness of contaminant-interacting material so that the mat provides very long term protection without the necessity of periodic replacement. The reactive mats described in the '681 patent and in the '241 publication provide alternating layers of geotextile/reactive material/geotextile/reactive material since a sufficient thickness of reactive material cannot be provided in a single reactive material core layer without that reactive material being lost during transportation or installation.

This assignee's U.S. Pat. Nos. 5,237,945 ('945) and 5,389,166 ('166) describe the manufacture of a water barrier formed from a clay-fiber mat that may include, intermixed with a powdered or granular bentonite clay, a powdered or granular liquid-interacting material, e.g., a contaminant-reactant, or providing the contaminant-reactant as a separate layer in the water barrier product. The water barrier mat formed in accordance with the '945 and '166 patents is manufactured by laying down geosynthetic fibers and the water swellable clay, with or without the contaminant-reactant material, simultaneously. In this manner, a geosynthetic composite material can be manufactured wherein the geosynthetic fibers are surrounded by the water-swellable clay, with or without the contaminant-reactant material, in initially forming a relatively thick geotextile. Such a mat must be subsequently consolidated after the initial formation of the mixture of powdered or granular material and fibers in an attempt to secure the fibers in position surrounding the powdered or granular material. The following problems may be encountered with filled mats manufactured by simultaneously mixing individual fibers together with powdered or granular materials in accordance with this assignee's U.S. Pat. Nos. 5,237,945 and 5,389,166: (1) Because interior fibers within the geotextile are not secured to adjacent fibers, particularly in thick mats, there would be lateral movement of powdered or granular material within the mat, particularly at the center of the mat thickness; (2) Any reactive materials that have a relatively high hardness, e.g., coke breeze, will prevent needle-punching as a means to consolidate the mats described in the '945 and '166 patents, since the hard materials will cause needle breakage and frequent replacement of worn needles; (3) Needle-punching as a means to consolidate the '945 and '166 mats is limited to relatively thin mats, e.g., less than 1 inch or 2.54 cm (25.4 mm), since fibers are too short to traverse the thickness of thicker mats for effective connection; and (4) Because of the shifting of fibers and powdered or granular material during manufacture of the '945 and '166 mats, the powdered or granular material will not be placed within the mat in a consistent quantity (weight per unit volume) and, therefore, will not provide consistent contaminant reaction, contaminant sorption, or contaminant neutralization per unit area. Another issue with the '945 and '166 mats is that when water swellable sodium bentonite clay is utilized, with or without the reactive material, when the sodium bentonite clay swells, the resulting swell pressure restricts the aqueous flow through the mat.

SUMMARY

In brief, described herein are bioremediating geocomposite mats, and their method of manufacture, for controlling contaminants in soil or water that allow the passage of essentially non-contaminated water therethrough, or provide for further contaminant digestion after the contaminants and bacteria leave the mat together for further digestion. The geocomposite mat includes a woven or non-woven geotextile, preferably having a thickness of about 6 mm to about 200 mm, preferably about 10 mm to about 100 mm, and containing a bacteria capable of digesting an organic contaminant that passes into the mat. In a second embodiment, the bacteria-containing mat is formed to include a porosity sufficient to receive a powdered or granular contaminant-reactive material, contaminant-sorptive material, or a contaminant-neutralizing material (hereinafter collectively referred to as "contaminant-reactant material" or "contaminant-reactive material") throughout its thickness, or in any portion of the thickness, across its entire major surface(s). In the second embodiment, the powdered or granular contaminant-reactive material is disposed within the pores of the geotextile mat to surround the fibers, e.g., by vacuum suction or by vibrating the mat while in contact with the contaminant-reactive material to allow the powdered or granular contaminant-reactive material to flow, by gravity and vibrational forces, into the pores of the previously formed geotextile. A solid bacterial (i.e., yeast) can be premixed with the reactive material in a hopper and then disposed into the pores of the geotextile or the bacteria and reactive material can be disposed separately into the geotextile in either order of addition. If bacteria needs to be applied as a liquid or slurry, it may be advantageous to pre-absorb or absorb the slurry on an absorbent or adsorbent, such as activated carbon or a nutrient source like peat moss.

In this second embodiment, the contaminant-reactive material can perform many functions, e.g., as a bacterial absorbent or a bacterial adsorbent, as a carbon source for the bacteria and/or as a contaminant absorbent or contaminant adsorbent to draw the contaminant into contact with bacteria held by the contaminant-reactive material. An important aspect of this second embodiment is to provide a powdered or granular material in a geocomposite mat (single or multi-layered) that acts as an "accumulation zone" by first interacting (e.g., adsorption, absorption, ion-exchange or reaction) with a contaminant to produce a zone within the geocomposite mat that has a relatively high concentration of contaminants. This accumulation zone with a relatively high contaminant concentration provides sufficient feedstock for bacteria to efficiently and quickly digest and reproduce. The bacteria would digest the contaminant, thus freeing up space for more adsorption or absorption of contaminants, and repeating the process. In one embodiment, liquid-permeable cover sheets are adhered to the upper and lower major surfaces of the bioremediating geotextile mat to prevent the bacteria (and in the second embodiment, also the powdered or granular material) from escaping from the geotextile during transportation and installation. Optionally, the edges of the filled geotextile can be sealed, such as by providing the upper and lower cover sheets slightly larger than the dimensions of the geotextile and gluing the extra cover sheet material to the edges of the filled geotextile or heat sealing them together. Other edge sealing options include sewing, needlepunching, heat welding and ultrasonic welding of the cover sheets together or by applying a separate, edge-covering material that can be glued, heat sealed or ultrasonically welded to the cover sheets. Edge sealing materials may be liquid-impermeable or liquid-permeable.

Bioremediation

Bioremediation is the process of using microorganisms to degrade contaminants, such as chemicals or heavy metals, to either harmless or less-toxic end products. Bioremediation may either be performed in situ or ex situ, and may be performed either with microorganisms endogenous to the site, termed intrinsic bioremediation, or with the addition of cultured microorganisms, termed bioaugmentation. The bioremediation mats and articles described herein, include added, cultured microorganisms and, therefore, are used in a bioaugmentation process.

The required constituents for bioremediation include: microbial cultures, electron donors and acceptors, and nutrients. Depending on the particular type of contamination, different combinations of microbial cultures and additional ingredients, such as electron donors, which provide energy and/or a carbon source for microbial metabolism; nutrients, such as sources of nitrogen and/or phosphorus; and electron acceptors, to provide energy and/or a carbon source for microbial metabolism, are selected to produce the desired bioremediation results. The additional ingredients, such as electron donors, electron acceptors, and nutrients, and optional enzymes are necessary for the metabolic pathway but may be present at the contaminated site. If not available at the site to be bioremediated, nutrient mixtures are added to the bioremediation mats described herein, and are available commercially, for example, NutriMax from Enzyme Technologies, 5228 N.E. 158th Ave., Portland, Oreg., 97230.

Function of the Contaminant in the Pathway

In bioremediation, the contaminant itself serves as a substrate in a metabolic pathway. A contaminant may serve as a primary substrate, i.e., as an electron donor or an electron acceptor, in a degradative metabolic pathway. Alternatively, the contaminant may be a secondary or cometabolic substrate, which is degraded fortuitously by cometabolism by one or more enzymes in the metabolic pathway without serving as an electron donor or an electron acceptor within the pathway itself. Cometabolic degradation of contaminants involves either the oxidation or reduction of the contaminant by an enzyme or cofactor produced during the microbial metabolism of another compound. Cometabolic degradation does not yield any energy or growth benefit for the microorganisms involved and may yield products that inhibit microbial growth. The same contaminant may serve as an electron acceptor in one pathway, an electron donor in another pathway, and be broken down by cometabolism in association with another pathway. Any one or any combination of these mechanisms can be employed in the bioremediation articles described herein.

Aerobic and/or Anaerobic Degradative Pathways

Certain contaminants are broken down in the bioremediation articles described herein by aerobic oxidative metabolic pathways, while others are broken down by anaerobic reductive pathways, and still others may be degraded by either aerobic or anaerobic metabolic pathways. For example, fuel hydrocarbons, like oil or gasoline, are usually degraded via an aerobic pathway. Some chlorinated organic compounds, like carbon tetrachloride (CT), are degraded via an anaerobic pathway, while others, like trichloroethylene (TCE), may be degraded by either aerobic or anaerobic pathways. For example, highly chlorinated hydrocarbons are preferentially degraded by pathways in which they serve as electron acceptors, such as anaerobic, reductive dehalogenation pathways under nitrate-, iron-, sulfate-reducing, and methanogenic conditions, where an appropriate carbon source, e.g., activated carbon, is provided in the bioremediation articles described herein as an electron donor. The carbon source may be naturally occurring organic matter, co-contaminating fuel hydrocarbons, or introduced as part of the bioremediation mats described herein. Less chlorinated hydrocarbons are primarily degraded by aerobic, oxidative pathways in which they can serve as the electron donor; examples of compounds for which this type of pathway is likely to be successful are vinyl chloride, dichloroethene, and 1,2-dichloroethane. The hydrocarbons can also serve as a carbon source in these pathways.

Example Systems for Degradation of Specific Contaminants

Broadly speaking, the most successful bioremediation requires matching the contaminants present with the appropriate metabolic pathway or pathways, and therefore with the appropriate microorganism(s), to degrade them.

Halogenated volatile organic compounds (VOCs) are the most frequently occurring type of contamination at hazardous waste sites. In this class are chlorinated aliphatic hydrocarbons (CAHs), widely used as industrial solvents and degreasers, which include tetrachloroethylene (also known as perchloroethylene or PCE), TCE, dichloroethylene (DCE), and vinyl chloride (VC). For contaminants in this class, *Dehalococcoides ethenogenes* strain 195, *Dehalococcoides* sp. strain FL2, and *Dehalococcoides* strain BAV-1 (available commercially as Bio-Dechlor INOCULUM from Regenesis, 1011 Calle Sombra, San Clemente, Calif. 92673) can dechlorinate tetrachloroethylene (also known as perchloroethylene or PCE), TCE and VC to ethene using an anaerobic reductive dechlorination pathway, also called halorespiration, in which these chlorinated hydrocarbons serve as electron acceptors and molecular hydrogen, typically obtained indirectly by the fermentation of organic substrates, is the electron donor. By contrast, *Desulforomonas michiganensis* strain BRS 1 degrades these same contaminants to cis-DCE (cis-1,2-dichloroethylene) and uses lactate, which can be supplied by adding an amendment such as polylactate ester or glycerol polylactate (available commercially as HRC and HRC-X, respectively, from Regenesis) as the electron donor. These species are sensitive to oxygen and should be utilized in reducing conditions with low oxygen concentrations, such as within a contaminated water supply, *Pseudomonas stutzeri* KC bacteria have been used to treat CT contamination.

Aerobic pathways are typically chosen for degradation of contaminants like hydrocarbon fuels, such as gasoline/BTEX (benzene, toluene, ethylbenzene, and xylene), diesel fuel, heating oil, crude oil, kerosene, and jet fuel, and other hydrocarbons such as phenol and toluene. Hydrocarbon fuels have been shown to be biodegraded by various Pseudomonas species. A number of commercially available bacterial consortia shown to degrade these types of contaminants are available, such as PetroMax from Enzyme Technologies. In these pathways, oxygen is preferentially used as the electron acceptor and is consumed during the degradation. Because of oxygen's low solubility in water and the limited rate of oxygen mass transfer into soils from the air, oxygen is typically a limiting factor in aerobic oxidative bioremediation of hydrocarbon fuels and, therefore, should be supplied as an additive to the bioremediation mats described herein, together with the endogenous microorganisms or with a specific culture introduced as part of a bioaugmentation strategy in order to maximize the speed and extent of biodegradation. Oxygen can be supplied by bubbling it into the contaminated earth or water supply, introducing it by blowers, or by concentrated oxygen releasing compounds, such as potassium superoxide, hydrogen peroxide and/or derivatives thereof, such as magnesium peroxide and/or calcium peroxide, or by commercially available oxygen releasing compounds (such as an ORC (an oxygen releasing compound, such as a mixture of magnesium peroxide ($MgO_2$), and magnesium oxide)); and ORC Advanced (such as a mixture of calcium oxyhydroxide [CaO(OH)$_2$], calcium hydroxide [Ca(OH)$_2$], and calcium carbonate [$CaCO_3$] from Regenesis).

Polyaromatic hydrocarbons (PAHs) found in soil and water contaminated by creosote and other industrial chemicals, such as naphthalene, acenapthylene, acenapthene, fluorine, phenanthrene, benzo (a) anthracene, chrysene, fluoranthene, pyrene, benzo (b) fluoranthene, benzo (k) fluoranthene, benzo (a) pyrene, dibenzo (a,h) anthracene, benzo (g,h,i) perylene, and indeno (1,2,3-cd) pyrene, have been shown to be degraded by white rot fungi, such as *Phanerochaete chrysosporium*, and by various bacterial species. A commercially available consortium of bacteria, EZT-A3, is available from Enzyme Technologies.

Nitroaromatic and chlorinated pesticides can also be degraded by bioremediation with specific microorganisms. The chlorinated pesticide hexachlorocyclohexane can be degraded by *Sphingomonas paucimobilis*, and the nitroaromatic pesticide paranitrophenol can be degraded by *Arthrobacter protophormiae* RKJ100. The herbicide Metamitron is degraded to desaminometamitron by a variety of soil microbes, including *Rhodococcus* and *Arthrobacter* species.

Contamination at a site is often of a complex nature, with a mixture of CAHs, hydrocarbon fuels, PAHs. In such cases, salting the bioremediation mats with one or more microorganisms that can biodegrade a wide variety of contaminants could be preferable. For example, *Phanerochaete chrysosporium* and other "white rot fungi" produce ligninolytic enzymes, which have broad activity against pesticides, chlorinated solvents, and aromatic hydrocarbons.

TCE has been shown to be degraded by *Burkholderia cepacia* G4, PR1$_{301}$ by an aerobic oxidative cometabolic pathway, while PCE, TCE, DCE, VC, and DCA are all degraded by *Dehalospirillium multivorans, Dehalobacter restrictus*, and *Dehalococcus etheneogenes* by an anaerobic, reductive dehalorespiratory pathway. A similar pathway is used by *Alcaligenes hydrogenopheya* to degrade TCE. Looking at alternative anaerobic pathways, PCE, TCE, DCE, VC, and DCA are degraded via an anaerobic, reductive cometabolic dechlorination pathway by *Methanosarcina barkeri* and *Desulfomonile tiedjei*; a similar pathway is used by *Shewanella putrefaciens* MR-1 to degrade CT.

Suitable powdered or granular contaminant-reactive materials, to act as an accumulation zone for the second embodiment, include organophilic clay, activated carbon, coke breeze, zero-valent iron, apatite, zeolite, peat moss, polymeric ion exchange resins, polymeric adsorbents and mixtures thereof. If the contaminant-reactive material is lighter than water, where the reactive mat is intended for sub-aqueous disposition, such as activated coke breeze, the geotextile fibers can be a material that is heavier than water, such as a polyester. Another method of providing the geocomposite mat with a density greater than water, if the contaminant-reactive material and/or the geotextile fibers are lighter than water, is to mix the contaminant-reactive material with a powdered or granular material that is heavier than water, such as sand. Any geosynthetic fibers may be used where the reactive material is heavier than water, such as polyolefins, e.g., polypropylene, polyethylene and copolymers thereof; rayon; polyesters; nylon; acrylic polymers and copolymers; polyamides; polyamide copolymers; polyurethanes, and the like.

The method of manufacture permits the manufacture of a bioremediating geocomposite article that includes a contaminant-reactant material that is structurally secure, without lateral movement, and contains contaminant-reactant material uniformly disposed throughout the thickness, or throughout a desired upper, central, and/or lower portion of the thickness of the geocomposite. The geocomposite can be manufactured to provide either a flexible or a rigid geocomposite material, and permits the manufacture of various modified geocomposites; geocomposite articles that include a contaminant-reactant material, such as a zeolite or an organophilic clay with or without a water-absorbent material for treatment of contaminants in water, in an organic liquid, or in a mixture of water and an organic liquid; a minimum of leakage of powdered or granular materials held by the pre-formed mat; the application of layer(s) of liquid-permeable films or sheets of material over both major surfaces of the article to confine the granular or powdered material in place within the pre-formed geotextile; the application of solid or liquid adhesive materials or compositions to one or both major surfaces and/or to any of the edges of the geocomposite article for complete retention of essentially all powdered and/or granular materials; the capability of inserting one or more rigidifying materials into, or onto, the geocomposite article during manufacture, such as a sheet of perforated fiberglass; rope; cardboard; relatively rigid, liquid-permeable corrugated materials, e.g., corrugated cardboard, and the like at some point at or between the top and bottom major surfaces of the geocomposite article to provide various degrees of flexibility or rigidity; the capability of manufacturing the geocomposite articles without the necessity of a consolidation step; and providing various sizes, shapes and weights of pre-formed, high loft geotextiles to achieve the benefits of each. If a water-absorbent, water-swellable material, such as sodium bentonite is included with the contaminant-reactive material, it should be included in an amount less than about 20 $lb/ft^3$, preferably 0 to about 10 $lb/ft^3$, more preferably 0 to about 5 $lb/ft^3$ so that, upon swelling, it does not prevent the flow of contaminated water through the geocomposite mat.

The contaminant-reactant material can be withheld from an upper or lower major surface of the high loft geotextile, if desired, to provide a space or area for the contaminant-reactant material to expand upon reaction or sorption with, or neutralization of the contaminants; or to provide areas for the addition of other powdered or granular materials, such as an organophilic clay, a zeolite or other contaminant-treating material. For example, the contaminant-reactant material can be omitted throughout a predetermined thickness at the top major surface or the bottom major surface. Alternatively, a powdered or granular water-swellable clay material can be applied in a relatively high concentration at or near the edges of the geocomposite article adjacent to one or both major surfaces to permit the contaminant-reactant material layer to extrude through a water-permeable cover layer to a planar edge surface immediately above and/or below one or both exterior major surfaces, thereby creating a sealing layer of contaminant-reactant material capable of sealing at overlaps and seams between adjacent or overlapping geocomposite articles.

As shown in FIG. 6, it is preferred to seal the edges 193 of the bioremediating geocomposite articles 10 by providing excess cover material 192 and/or 194 in an amount sufficient so that one or both of the cover layers 192 and/or 194 can be overlapped and adhered together, at or above the edge 193, via an adhesive, thermal bonding (heat-sealing), needlepunching, or sonic welding.

Accordingly, one aspect of the bioremediating geocomposite articles described herein is to provide a new and improved article of manufacture and method of making the article by incorporating an organic contaminant-digesting bacteria into a mat of interconnected, geotextile fibers.

Another aspect of the bioremediating geocomposite articles described herein is to provide a new and improved article of manufacture and method of making the article by incorporating an organic contaminant-digesting bacteria into a high loft, pre-formed mat of interconnected, geotextile fibers.

A further aspect of the second embodiment of the bioremediating, geocomposite articles described herein is to provide a new and improved article of manufacture including a powdered or granular contaminant-reactant or contaminant-interacting material, wherein the material is selected from the group consisting of an organophilic clay, a zeolite, a contaminant-absorbent, a contaminant-adsorbent, an ion-exchange material, a contaminant-reactant, a contaminant-neutralizing material, and mixtures thereof as separately applied or intermixed material. The powdered or granular materials may be applied as an admixture, or applied sequentially within a pre-formed textile mat, preferably having a sufficient apparent opening size, e.g., about 0.5 to about 6 mm, preferably about 1 mm to about 4 mm, to receive the powdered or granular material in an amount of at least about 10 $lb/ft^3$ up to about 150 $lb/ft^3$, preferably about 30 $lb/ft^3$ to about 100 $lb/ft^3$, throughout the thickness, or throughout any upper or lower portion of the thickness of the pre-formed mat. Preferably, the powdered and/or granular material will occupy about 50% to about 99.9% by volume of the pre-formed geotextile mat, more preferably about 80% to about 99.9% of the pre-formed mat.

The above and other aspects and advantages of the geocomposite articles and their method of manufacture will become apparent from the following detailed description of the preferred embodiments taken in conjunction with the drawings.

BRIEF DESCRIPTION OF THE DRAWINGS

FIG. 7 is a schematic view of an alternative method and apparatus for manufacturing the bioremediating articles described herein; and FIG. 7a is an enlarged, partially broken-away side view of the bioremediating article manufactured in accordance with the method and apparatus of FIG. 7.

DETAILED DESCRIPTION OF THE PREFERRED EMBODIMENTS

Figure 1:
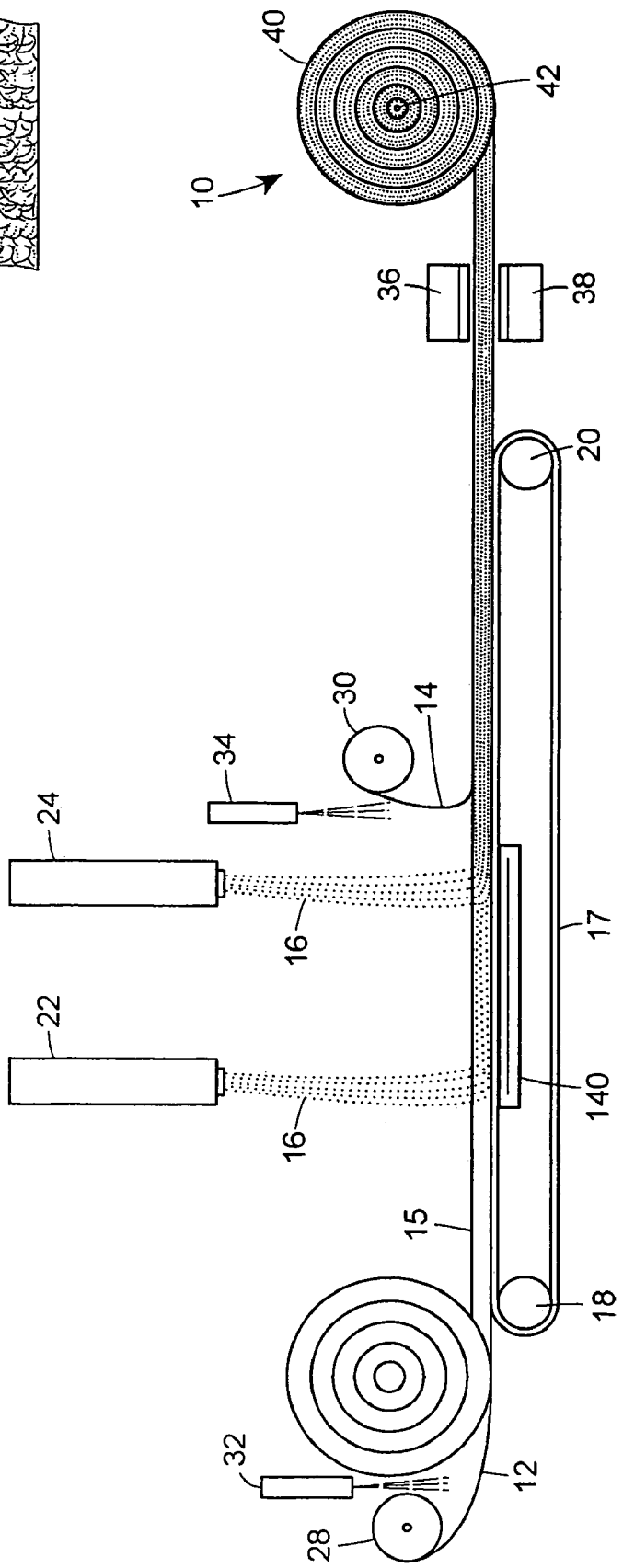
FIGS. 1 and 3 are schematic views of alternate methods of manufacture and apparatus used to make the bioremediating geocomposite articles described herein.

Turning now to FIG. 1, there is shown a schematic diagram for manufacturing the geocomposite articles 10 described herein, including many optional features any one or more of which can be included in the manufacturing process to provide various characteristics and properties to the geocomposite articles. It should be understood that when the geocomposite articles are to be used to remediate a contaminant that requires an anaerobic reductive pathway, the geocomposite articles described herein should be packaged in an air-impermeable wrapper under anaerobic conditions, e.g., vacuum packaging and/or using an inert gas, such as nitrogen, to replace air surrounding the packaged articles.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The geocomposite article 10 is manufactured to include a layer of woven or non-woven liquid-permeable sheet material 12 and 14 on both major exterior surfaces; various reinforcing material can be included within the interior and/or exterior of the article to provide structural reinforcement or to provide various degrees of article rigidity; portions of a high loft geotextile 15, along its upper and/or lower major surfaces can be left with low concentrations of, or without, a powdered or granular material, such as a powdered bacteria, e.g., bread yeast or beer yeast, so that a portion of the article is very porous to allow for venting of gases captured by the article from below; and powdered or granular materials such as a contaminant (organic) reactant absorbent or adsorbent and a bacteria, and, optionally a water-absorbent material, such as bentonite clay, that may contain an absorbed and/or adsorbed bacteria, can be intermixed with the contaminant-reactant material(s) 16 being deposited onto the pre-formed, high loft geotextile 15. Any of these features can be used alone or together with any of the other features, as best shown in FIGS. 1 and 3, to provide very unique geocomposite articles having any number of different properties and the capability of containing the spread of contaminants.

Figure 3:
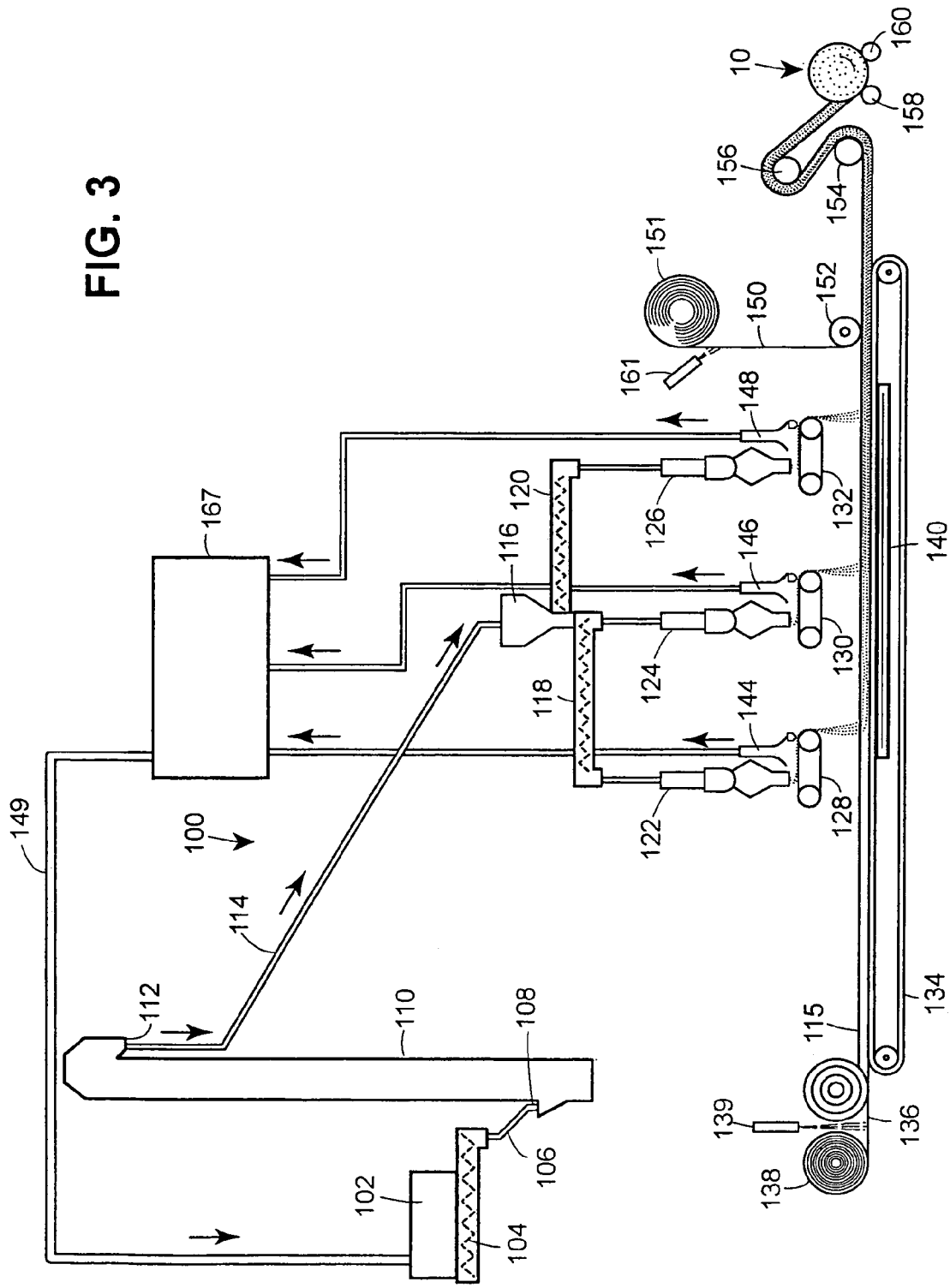

As shown in FIGS. 1 and 3, there is illustrated a method and apparatus, including a number of optional features each of which can be used alone or in combination with any of the other features for manufacturing a product having single or plurality of different granular or powdered contaminant-reactant materials, one or more bacterias, nutrients, and/or electron donors and electron acceptors, and with or without an oxygen releasing compound and various reinforcing materials and/or coating materials added to one or both exterior surfaces of the article being manufactured to provide various characteristics or properties to the finished geocomposite article 10, as will be described in more detail hereinafter. The apparatus generally includes a conveyor belt 17 that travels continuously around a pair of rollers 18 and 20, at least one of which is motor driven at a desired speed; and one or more contaminant-reactant feeding devices, generally designated by reference numerals 22 and 24.

The liquid-permeable sheet material layers 12 and 14, used to prevent loss of the powdered or granular material during transportation and installation, optionally are applied to the upper and lower major surfaces of the geotextile after loading the geotextile 15 with contaminant-reactant material, one or more bacterias, nutrients, and/or electron donors, electron acceptors and/or oxygen-releasing compounds. The preferred method of manufacture is to first adhere the lower liquid permeable sheet material 12 to the geotextile 15 then fill the geotextile 15 with the powdered or granular material, one or more bacterias, nutrients, and/or electron donors and electron acceptors, followed by adhering the upper, liquid-permeable sheet material 14 to the geotextile containing the powdered or granular material. These materials also could be added to the geotextile during initial manufacture of the geotextile mat, as shown in FIG. 1. In one embodiment, the powdered or granular material 16 penetrates the high loft geotextile 15 by vibrating the geotextile 15 with vibrator 140. Alternatively, vacuum can be applied under the geotextile 15.

Additional contaminant-reactant material, and/or bacteria in liquid, slurry, granular or powdered form can be applied to the filled geotextile 15 from feeding conduit 24 to provide one or more surface concentrations of contaminant-reactant material, and/or bacteria or to apply a different powdered or granular contaminant-reactant, such as nutrients, electron donors, electron acceptors, oxygen-releasing compounds, and the like, prior to applying the water-permeable cover layers 12 and 14. Upper and lower major surfaces then are covered with the water-permeable, preferably non-woven, cover layers 12 and 14, from rolls 28 and 30, that are preferably adhered to the major surfaces of the geotextile 15 using a water-insoluble adhesive, applied from adhesive supply vessels 32 and 34.

Additionally, slicing or searing devices 36 and/or 38 can be provided above and/or below the article to provide extrudability to the contaminant-reactant material from the article, e.g., for sealing a plurality of the geocomposite articles at overlaps. The slicing or searing devices 36 and/or 38 can be used to slice and/or sear one or both of the cover layers 12 and/or 14, at any point during the manufacture of the article 10, for improved extrusion to provide seam and/or overlap sealing of adjacent articles, or the slicing step can be bypassed. The finished article 10 can be collected in a roll form 40 taken up on a suitable mandrel 42 or can be festooned onto pallets (not shown) or the like.

Figure 2A:
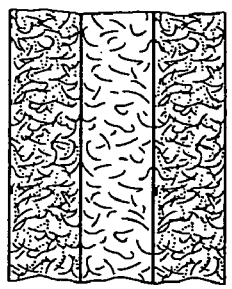
FIG. 2a is an enlarged, partially broken-away side view of a bioremediating geocomposite article formed with upper and lower layers of powdered or granular contaminant-reactant material.
Figure 2B:
FIG. 2b is an enlarged, partially broken-away side view of a bioremediating geocomposite article that has been filled with a powdered or granular contaminant-reactant material, such as an organophillic clay, and/or bacteria, one or more electron donors and electron acceptors, an oxygen-releasing compound, and/or one or more nutrients. In the preferred embodiment, the contaminant reactive material holds the bacteria and any necessary nutrients and/or electron donors and acceptors and/or ORC to provide an accumulation zone for contaminant digestion over any portion of the thickness, or over the entire thickness of the mat.

FIG. 2a shows high loft geotextile mat 15 filled only on upper and lower major surfaces with the powdered or granular material 16. FIG. 2b shows the high loft geotextile mat 15 filled with a powdered or granular material 16 incorporated throughout the geotextile mat 15.

Turning now to FIG. 3, there is shown a schematic diagram of one method of loading the pre-formed, high loft geotextile mat 115 with powdered or granular contaminant-reactant material in a dry state. The dry material feeding apparatus, generally designated by reference numeral 100 is useful for depositing one or more powdered or granular contaminant-reactant materials, such as an organophillic clay, from a receiving hopper 102. An auger 104 is disposed at a lower end of the receiving hopper 102, and in fluid communication therewith, to force the contaminant-reactant material through conduit 106 to an inlet 108 of elevator 110. The contaminant-reactant is discharged from the elevator 110 at elevator outlet opening 112, through conduit 114 into a receiving hopper 116. A pair of augers 118 and 120 in fluid communication with a lower portion of hopper 116 force the contaminant-reactant into one, two or three feeding mechanisms, generally designated by reference numerals 122, 124 and 126, for feeding the contaminant-reactant material in a controlled manner to one, two or three continuous feed conveyor belts 128, 130 and 132 successively aligned above an elongated product conveyor belt 134. The contaminant-reactant generally is applied over the high loft, geotextile mat 115 to substantially fill the void spaces between fibers in the high loft, geotextile mat 115 in an amount of about ¼ to 30 pounds of powdered or granular material per square foot of finished article major surface area, preferably about ¼ to about 5 pounds of powdered or granular material per square foot of article major surface area. In accordance with one embodiment, a supply of a liquid-permeable flexible sheet material 136 in roll form 138 is disposed above the continuous product conveyor belt 134 to provide a continuous supply of liquid-permeable flexible sheet material onto an upper surface of the product conveyor belt 134. The upper surface of sheet material 136 from roll 138 is sprayed with liquid adhesive from adhesive vessel 139 to adhere the sheet material to an under surface of the high loft geotextile 115, and the geotextile 115 then is filled with the powdered or granular material, from one or more of the feeding mechanisms 122, 124 and/or 126, deposited onto the geotextile 115 from one, two or all three of the feed conveyor belts 128, 130 and 132. Any one, two or all three of the feed conveyor belts 228, 230 and 232 can be used to incorporate the same or different powdered or granular contaminant-reactant materials throughout a portion of, or the entire thickness of the geotextile 115. Vibration apparatus 140 is connected to the product conveyor belt directly below the feed conveyor belts 128, 130, and 132 to vibrate the powdered or granular contaminant-reactant materials into the geotextile 115.

The individual powdered or granular materials are deposited across the entire width of the geotextile mat 115, as the particles drop from the feeders 122, 124 and/or 126. In this manner, the entire thickness or any portion of the thickness of the fibrous mat 115 is filled with the contaminant-reactant material. Dust collection suction devices 144, 146 and 148 may be disposed near each continuous contaminant-reactant feed conveyor belt 128, 130 and 132 to clear the air of fine particles emanating from feeding mechanisms 122, 124 and 126 and return the particles back to a dust collector 167 for disposal and/or back to the receiving hopper 102, via conduit 149. A second flexible, water-permeable sheet material 150, from roll 151, is disposed on a downstream side of the clay feeding mechanisms 122, 124, and 126 and above the product conveyor belt 134. The second flexible sheet material 150 is fed by power driven roller 152, power rollers 154 and 156 and wind up rollers 158 and 160 to dispose flexible, water-permeable sheet material 150 on top of the contaminant-reactant-filled article to dispose the filled geotextile material 115 between lower flexible sheet material 136 and upper flexible sheet material 150. Adhesive vessel 161 applies adhesive to a surface of sheet material 150 to adhere the sheet material 150 to an upper surface of the filled geotextile 115.

The powdered or granular contaminant-reactant material utilized to fill the void spaces between the fibers of the high loft, geotextile has a particle size in the range of about 1 to about 650 mesh, preferably about 10 to about 400 mesh, more preferably about 6 mesh to about 200 mesh.

Figure 4A:
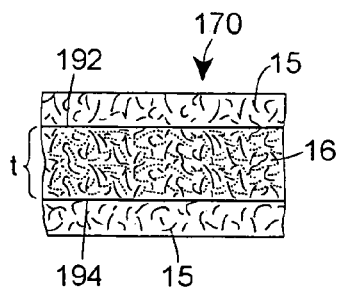
FIGS. 4a, 4b and 4c are enlarged, broken-away side views of articles manufactured as described herein that include intermediate liquid-permeable sheets or nets of strengthening materials and include a bacteria held by a powdered or granular contaminant-reactant material in only a portion of the thickness of the article.
Figure 4B:
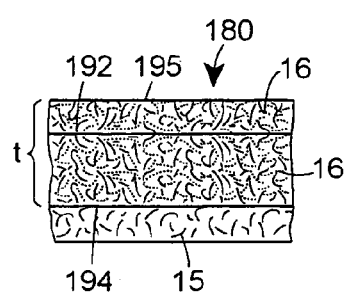
Figure 4C:
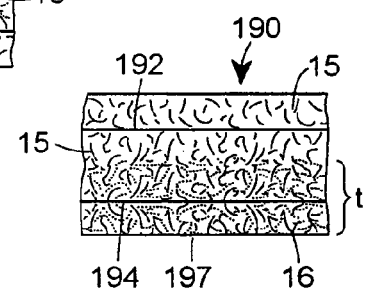

As shown in FIGS. 4a, 4b and 4c, the articles of manufacture generally designated by reference numerals 170, 180 and 190, respectively, are manufactured to include a powdered or granular material, such as an organophillic clay 16, incorporated into the geotextile 15 throughout only a portion of the overall thickness "t" of each article 170, 180 and 190. Each article 170, 180 and 190 is shown to include an upper sheet or netting 192 and a lower sheet or netting 194 of liquid-permeable polymeric sheet material, rope, netting, or other strengthening, or rigidifying materials, the same or different, incorporated within the interior of the article during manufacture in any desired combination. The article 170 of FIG. 4a includes the powdered or granular material 16 incorporated over a central portion of the article, defined between the two internal sheet or netting materials 192 and 199. The article 180 of FIG. 4b includes the powdered or granular material 16 in an upper portion of the article, above sheet material 192, and under an upper, liquid-permeable sheet material 195, as well as in a central portion of the article 180, between sheet material 192 and sheet material 194. The article 190 of FIG. 4c includes the powdered or granular material 16 incorporated within a lower half of the article 190, filling a lower portion of the article 190 between sheet material 194, and lower, liquid-permeable sheet material 197, and within a lower half of the central portion of article 190 between lower material 194 and upper material 192. Such materials may be manufactured by adhesively securing multiple articles, filled or unfilled, each filled portion being manufactured in accordance with the description of FIGS. 1 and 3.

Some of the most prevalent contaminants found in waste waters contained in ponds, lagoons, areas of subterranean structure and other water-releasing or organic (hydrocarbon) spill areas, particularly where these areas include industrial waste waters, are heavy metal ions and water-insoluble or partially water-insoluble organic materials. It is well known in the prior art that natural and synthetic zeolites and ion exchange resins are capable of removing a substantial portion of the heavy metal ions from a waste water solution and that organophilic clays are capable of removing water-insoluble organic materials from solution so that bacteria, held by the powdered or granular materials, e.g., organoclays, can digest the contaminants held by the organoclays, e.g., in an accumulation zone. However, the prior art suggests that removal of these materials from waste water streams should be done on-stream, treating the entirety of the waste water stream in order to remove these materials, requiring frequent replacement of treating materials because of the heavy volumes of waste water stream that passes through the zeolites or passes through the organophilic clays in order to clarify these waste water streams. By including an organophilic clay, or applying a mixture of water-swellable clay (not required) with a zeolite or organophilic clay, to fill the voids between fibers of the high loft geotextile 15 or 115, the zeolite and/or organophilic clay will form a water-treatment material wherein the zeolite and/or organophilic clay will remove the contaminants, e.g., hydrocarbon contaminants, and allow the clean water to pass through the geocomposite article 10.

Figure 5:
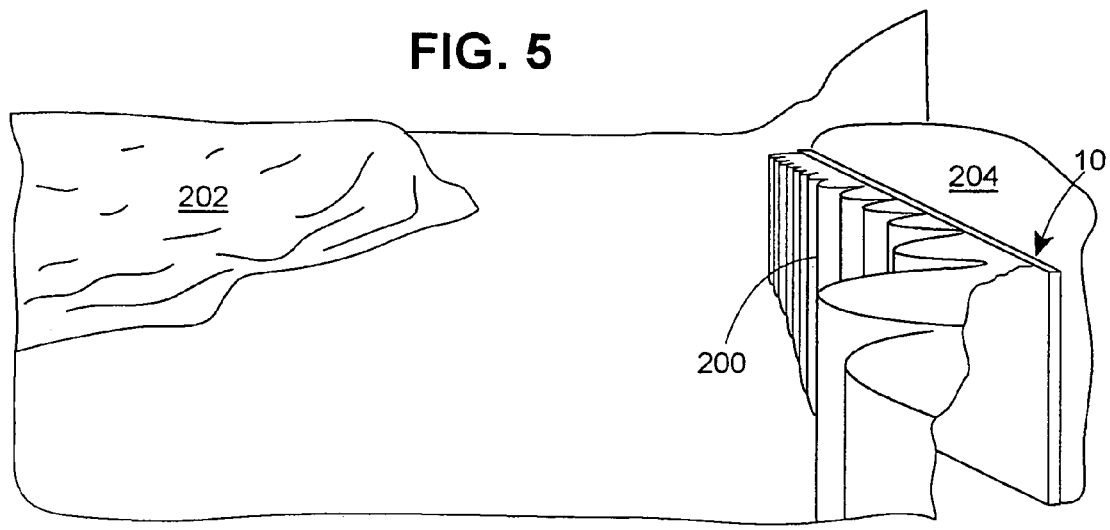
FIG. 5 is a perspective view showing the geocomposite article described herein oriented vertically, adjacent to a sea/soil interface, for sorbing contaminants, e.g., hydrocarbons from a petroleum fraction, that leach through soil and travel through the sea/soil interface, into the sea, to prevent the contaminants from traversing the sea/soil interface.
Figure 6:
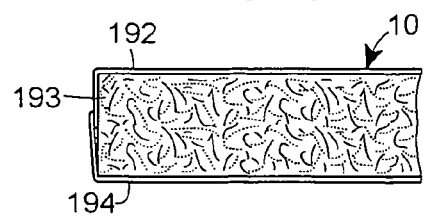
FIG. 6 is a partially broken-away side view of an edge of the geocomposite article having excess material from upper and lower cover sheets adhered together, either adhesively, by heat-sealing, or by ultrasonic welding, to seal the edges of the article.

As shown in FIG. 5, the geocomposite articles 10 containing bacteria, described herein, are particularly effective for vertical disposition adjacent to a sea/soil interface 200 for protecting a lake or ocean 202 against hydrocarbon contaminants that otherwise leach through soil 204 and penetrate the sea/soil interface 200.

As shown in FIG. 7, there is illustrated another method and apparatus for manufacturing a bacteria-containing geocomposite mat 10A that contains one or more bacterias, nutrients, and/or electron donors and electron acceptors, with or without an oxygen releasing compound and various reinforcing materials, outer liquid-permeable films and/or coating materials added to one or both exterior surfaces of the article being manufactured, as described with reference to FIG. 1, to provide various characteristics or properties to the finished geocomposite article 10A. The apparatus generally includes a conveyor belt 17 that travels continuously around a pair of rollers 18 and 20, at least one of which is motor driven at a desired speed; and one or more fiber and contaminant-reactant feeding devices, generally designated by reference numerals 22A and 24A.

Liquid-permeable sheet material layers (12 and 14 in FIG. 1), not shown in FIG. 7, may be used to prevent loss of the powdered or granular material during transportation and installation, and optionally are applied to the upper and lower major surfaces of the geocomposite article 10A after loading with contaminant-reactant material, one or more bacterias, nutrients, and/or electron donors, electron acceptors and/or oxygen-releasing compounds. As shown in FIG. 7, an alternative method of manufacture is to first provide a lower woven fabric 12A and deposit a thickness, e.g., 1 to 2 inches of fibers, e.g., polyethylene or polypropylene fibers 16A onto the woven fabric 12A, from fiber dispensing device 22A. The loosely deposited fibers 16A then are needlepunched to the woven fabric 12A using needlepunching apparatus 21, thereby forming an upper layer of a high loft geotextile 16B. The geotextile 16B then is filled with powdered or granular contaminant reactive material, one or more bacterias, nutrients, and/or electron donors and electron acceptors, followed by adhering an upper non-woven geotextile material 14A to the high loft geotextile 16B. The upper woven geotextile 14A can be adhered to the high loft geotextile 16B by adhesive spray apparatus 34A, or can be heat welded or ultrasonically welded thereto. These bioremediation materials also could be added to the geotextile during initial manufacture of the geotextile mat, as shown in FIG. 1. In one embodiment, the powdered or granular material 16C, preferably containing bacteria, penetrates the high loft geotextile 16B by vibrating the geotextiles 12A and 16B with vibrators 140. Alternatively, vacuum can be applied under the geotextiles 12A and 16B.

Additional contaminant-reactant material, and/or bacteria in liquid, slurry, granular or powdered form can be applied to the filled geotextile 16B from additional feeding conduits, not shown, to provide one or more surface concentrations of contaminant-reactant material, and/or bacteria or to apply a different powdered or granular contaminant-reactant, such as nutrients, electron donors, electron acceptors, oxygen-releasing compounds, and the like, prior to applying the non-woven cover layer 14A. Upper and lower major surfaces then, optionally, can be covered with water-permeable films, as described with reference to FIG. 1.

FIG. 7A shows a side view of the bioremediating geocomposite mat 10A containing bacteria and contaminant-reactive material filled only in a central, non-woven, needlepunched layer, manufactured in accordance with the method and apparatus of FIG. 7.

In accordance with another important embodiment of the bacteria-containing geocomposite articles described herein, the contaminant-reactant material, comprising any contaminant-adsorbent, -absorbent, -reactant, or -neutralizing material can be supplied as a separate layer, containing bacteria and, if necessary, nutrients, electron donors, electron acceptors, and/or oxygen-releasing compounds, adjacent to another powdered or granular contaminant-reactant material so that the amount of material treated for the removal of a given contaminant is only that material which penetrates the adjacent layer of powdered or granular material.

In accordance with another important feature of the present invention, the bacteria and contaminant-reactant materials mixed or supplied as separate layers, can be any material capable of adsorbing, absorbing, neutralizing, or reacting with the contaminant for insolubilization and/or separation of the contaminant from the liquid stream flowing through the reactive material. In the preferred embodiment, the contaminant-reactive material includes bacteria so that the contaminant-reactive material provides an accumulation zone for bacteria digestion of the contaminants. Examples of materials capable of removing or neutralizing contaminants include absorbent fibers, such as microcrystalline cellulose; attapulgite clay; zinc rincinoleate absorbed on an absorbent fiber or other absorbent material; amorphous silica powder; synthetic calcium silicate; polyolefin pulp; sodium alumino-silicate (type A sodium zeolite); maltodextran; sodium silica aluminates (note that all the above are absorbents). Other materials, such as adsorbents include microcrystalline cellulose; silica hydrogel based compositions; attapulgites; synthetic sodium magnesium silicates; synthetic calcium silicates; silicon dioxide; acid activated clays; type A sodium zeolites; and the like provided as a separate layer or mixed with the absorbents and/or adsorbents. Other materials can be included such as an algicide, antimicrobial material, bactericide, disinfectant, and/or fungicides such as phenol; zinc undecylenate N.F.; acetyl tyridinium chloride N.F.X.III and the like.

Most preferred as the adsorbent, absorbent and/or reactant and/or neutralizing material are coke breeze, activated carbon, natural or synthetic zeolites, apatite, and/or an organophilic clay, which is basically a montmorillonite clay that has been reacted with a quaternary organic material to make it hydrophilic and absorbent to organic contaminants.

The high loft geotextile mat 15 or 115 can be woven or non-woven. Suitable fibers of construction of the geotextile mat 15 or 115 include fibers made from rayon, polypropylene, polyesters, nylon, acrylic polymers and copolymers, ceramic fiber, fiberglass, propylene-ethylene copolymers, polypropylene-polyamide copolymers, a single monofilament, polyethylene, polyurethane, cotton, jute and any other non-biodegradable, or very slowly biodegradable, fibers preferably having both bacteriological and chemical resistance. In some installations, the thickness of the article is not important and such articles can be formed with any desired thickness, e.g., 3 mils to about 4 inches containing about 0.2 to about 30 pounds per square foot of contaminant-reactant material.

The above-described bacteria-containing geocomposite mats can be modified in a number of ways to suit various purposes and this adaptability of the products is one of the primary benefits when compared with water barriers of the prior art. For example, the geocomposite products described herein can be loaded with a heavy material such as metal screen, or a heavy mineral such as Barite, iron oxide, sand or the like, relatively uniformly, together with a powdered or granular contaminant-reactant so that the overall product has a specific gravity greater than 1.0 thereby enabling the material to submerge easily in water. Accordingly, the product can be applied to the soil surface at the bottom of a filled lagoon, waste containment area, and the like, without first draining the lagoon or waste containment area. The product containing a heavy mineral can be rolled out over the water or waste containment upper level and allowed to sink to cover the soil surface at the bottom of the water or liquid waste material, thereby saving substantial time, effort and expense in sealing a pre-existing lagoon, waste containment area, and the like, without first draining the lagoon or waste containment area.

In another embodiment, the products described herein can have incorporated therein a very light material such as expanded vermiculite or expanded perlite, so that the product has substantial buoyancy in water, liquid waste materials, and the like, to form a cover over a liquid waste containment area, such as a toxic waste lagoon, to prevent external compounds, dust, and dirt from entering the waste containment area. One portion of this cover material can be adapted for removal or rolling back so that additional toxic waste and the like may be added to the covered containment area while maintaining a water-impervious cover to prevent further filling of the waste containment area with rain water.

In one embodiment, the products described herein can be essentially a single non-woven fabric material, so that it can elongate, where elongation is a desirable characteristic, while retaining the desired contaminant-removal characteristics. Further, drainage structures and other articles used in the water drainage arts can be virtually incorporated into the interior of this product during manufacture, e.g., under the upper and/or lower cover sheets. Herbicides, tracer chemicals, various colorants that indicate contact with a particular chemical or class of chemicals, and the like, also can be incorporated into the articles described herein. In another embodiment, the mats are multi-layered mats including a separate layer of bacteria-containing powdered or granular material.

The product is particularly effective in shored wall conditions for application against steel sheet piling; soldier beam and lagging; soldier beam and earth installations; concrete caissons; earthen stabilized wall structures and diaphram wall structures. In addition to the usual geotextile-type fibers, cellulosic fibers can be used as well as hay, straw, coconut fibers and fibers refined from wood chips and the like, particularly for use as an agricultural root zone liner to provide liquid feed for the promotion of plant growth. The products described herein are also useful as gas barriers, particularly Radon gas barriers, to protect structures and containers above or below ground. Many other uses for the products of the present invention should be apparent to those skilled in the art.

The uses for the bacteria-containing powdered or granular material-filled or partially-filled products described herein are virtually infinite since the product can be made completely flexible, relatively rigid or rigid and can be applied against very contoured and slopping surfaces, rough or smooth, as well as vertical surfaces, such as foundation walls, dams, along the sides of canals and below grades such as in tank farms, and for irrigation and water conservation techniques. The products are substantially better than layered products having an intermediate layer of powdered or granular material since the fabric of the present invention will not peel apart and the contaminant-reactant material has much less tendency to leak out of the product during handling and installation. Further, there is essentially no slippage of fabric since the product is, basically, a single non-woven fabric containing active material(s).

The products have a number of other advantages over the prior art layered products that include an upper and lower fabric surrounding an interior layer of bentonite clay since the products can be, essentially, a single fabric layer that is filled or partially filled with any bacteria, with or without a desired powdered or granular contaminant-reactant material, while optionally including interior space for absorption or expansion of an interior powdered or granular material, such as a water-swellable clay containing bacteria. The products are particularly well suited for providing contaminant-removal in shored wall conditions to protect surface areas that are either vertical, sloped or horizontal. The products are very durable because of the method of manufacture, since, in one embodiment, strength is not dependent upon any method of structurally securing two separate fabric layers together across an intermediate layer of powdered or granular material. Such prior art layered products are significantly less durable than the products described herein because of their tendency to separate as a result of shear forces between top and bottom fabric layers, particularly where such layered products are installed over vertical or slopping surface, where shear forces are most prevalent.

EXAMPLES

Example 1

(Activated Carbon Only)

The lower cover fabric was a 1.5 ounce/yd$^2$ pointbonded polyester nonwoven fabric. Using hot air blowers, this lower cover fabric was laminated to the Core fabric which consisted of 12 ounces/yd$^2$ high loft polyester nonwoven fabric. To this assembly 0.5 pounds of activated carbon was vibrated into the core nonwoven fabric. After the activated carbon had settled into the core nonwoven fabric, a top cover nonwoven was hot air laminated to the upper surface of the core nonwoven. The upper cover fabric was a 1.5 ounce/yd$^2$ pointbonded polyester nonwoven fabric.

Example 2

(Activated Carbon and Bacteria)

In a hopper with a mechanical mixer, 20 pounds of activated carbon and 10 pounds of solid bacteria (baking yeast) were uniformly mixed. On the reactive core mat production line, the following steps were used to construct the bioremediation mat containing activated carbon and bacteria. The lower cover fabric was a 1.5 ounce/yd pointbonded polyester nonwoven fabric. Using hot air blowers, this lower cover fabric was laminated to the Core fabric which consisted of 12 ounces/yd$^2$ high loft polyester nonwoven fabric. To this assembly 0.7 pounds/ft$^2$ of the activated carbon/bacteria mixture was vibrated into the core nonwoven fabric. After the activated carbon/bacteria mixture had settled into the core nonwoven fabric, a top cover nonwoven was hot air laminated to the upper surface of the core nonwoven. The upper cover fabric was a 1.5 ounce/yd$^2$ pointbonded polyester nonwoven fabric.

Example 3

(Organoclay and Bacteria)

In a hopper with a mechanical mixer, 15 pounds of organoclay and 15 pounds of solid bacteria (baking yeast) were uniformly mixed. On the reactive core mat production line, the following steps were used to construct the bioremediation mat containing organoclay and bacteria. The lower cover fabric was a 1.5 ounce/yd$^2$ pointbonded polyester nonwoven fabric. Using hot air blowers, this lower cover fabric was laminated to the Core fabric which consisted of 12 ounces/yd$^2$ high loft polyester nonwoven fabric. To this assembly 0.86 pounds/ft$^2$ of the organoclay/bacteria mixture was vibrated into the core nonwoven fabric. After the organoclay/bacteria mixture had settled into the core nonwoven fabric, a top cover nonwoven was hot air laminated to the upper surface of the core nonwoven. The upper cover fabric was a 1.5 ounce/yd$^2$ pointbonded polyester nonwoven fabric.

Example 4

(Organoclay and Bacteria with Vacant Space in Core Nonwoven)

In a hopper with a mechanical mixer, 5 pounds of organoclay and 3 pounds of solid bacteria (baking yeast) were uniformly mixed. On the reactive core mat production line, the following steps were used to construct the bioremediation mat containing organoclay and bacteria. The lower cover fabric was a 1.5 ounce/yd² pointbonded polyester nonwoven fabric. Using hot air blowers, this lower cover fabric was laminated to the Core fabric which consisted of 12 ounces/yd² high loft polyester nonwoven fabric. To this assembly 0.40 pounds/ft² of the organoclay/bacteria mixture was vibrated into the core nonwoven fabric. The 0.40 pounds/ft² occupied approximately 50% of the open area in the core nonwoven and left approximately 50% of the open area of bacteria expansion as the contaminants were digested. After the organoclay/bacteria mixture had settled into the core nonwoven fabric, a top cover nonwoven was hot air laminated to the upper surface of the core nonwoven. The upper cover fabric was a 1.5 ounce/yd² pointbonded polyester nonwoven fabric.

Example 5

(Activated Carbon in Alternate Mat Construction Technique)

In this example the high loft core fabric is formed by needlepunching fibers to a woven fabric. The lower woven fabric is a 3 ounces/yd² polypropylene. On top of this lower cover woven fabric are laid loose polypropylene fibers with a staple length of 75-90 mm and 110 denier. The mass per unit area of the high loft fibers is in the range of 9 to 12 ounces/yd². After the loose staple fibers are deposited on top of the woven fabric, the preassembly moves through a needlepunching loom where the polypropylene staple fibers are needlepunched together and to the woven material. The formed high loft core has a thickness of approximately 20 mm (at 14 ounces/yd² of fiber loading). Activated carbon at a loading of 0.9 pounds/ft² is vibrated into the high loft portion of the matrix. A upper cover fabric of 1.5 ounce/yd² pointbonded polyester nonwoven fabric is hot air laminated to the core fabric.

Example 6

(Organoclay and Bacteria in Alternate Mat Construction)

In a hopper with a mechanical mixer, 10 pounds of organoclay and 4 pounds of solid bacteria (baking yeast) were uniformly mixed. In this example the high loft core fabric is formed by needlepunching fibers to a woven fabric. The lower woven fabric is a 3 ounces/yd² polypropylene. On top of this lower cover woven fabric are laid loose polypropylene fibers with a staple length of 75-90 mm and 110 denier. The mass per unit area of the high loft fibers is in the range of 9 to 12 ounces/yd². After the loose staple fibers are deposited on top of the woven fabric, the preassembly moves through a needlepunching loom where the polypropylene staple fibers are needlepunched together and to the woven material. The formed high loft core has a thickness of approximately 20 mm (at 14 ounces/yd² of fiber loading). The mixture of organoclay and bacteria at a loading of 1.2 pounds/ft² is vibrated into the high loft portion of the matrix. An upper cover fabric of 1.5 ounce/yd² pointbonded polyester nonwoven fabric is hot air laminated to the core fabric.

The invention claimed is:

1. A bioremediation geocomposite article for treating contaminants in soil or water comprising
   a geotextile mat formed from woven or non-woven geotextile fibers, having a thickness of about 6 mm to about 200 mm and having upper and lower major surfaces, wherein the geotextile mat has void spaces between the geotextile fibers that receive organophilic clay and bacteria there between or absorbed therein;
   a powdered or granular organophilic clay containing a contaminant-digesting bacteria disposed in said geotextile mat; and
   adjacent geotextile layers secured to said organophilic clay and bacteria-containing geotextile mat to secure the organophilic clay and bacteria-containing geotextile mat therebetween, wherein one of the surrounding geotextile layers is unfilled.

2. A bioremediation geocomposite article in accordance with claim 1, wherein the article includes liquid-permeable cover sheets adhered to the upper and lower major surfaces to confine the bacteria within the geotextile article.

3. The geocomposite article of claim 1, wherein the powdered or granular material has a particle size such that at least 90% of the particles have a size in the range of about 6 mesh to about 650 mesh.

4. The geocomposite article of claim 1, wherein the powdered or granular material comprises about 1% to about 99.9% by volume of the geotextile mat.

5. The geocomposite article of claim 1, wherein the geocomposite article has 30 lb/ft³ to 100 lb/ft³ of powdered or granular material contained therein, and the powdered or granular material includes bacteria mixed therewith, adsorbed thereon, or absorbed therein.

6. The geocomposite article of claim 1, wherein the geotextile fibers are selected from the group consisting of polyethylene fibers, polypropylene fibers, polyester fibers and polyamide fibers.

7. The geocomposite article of claim 1, wherein the geotextile mat is non-woven.

8. The reactive geocomposite article of claim 2, wherein the liquid-permeable cover sheets are non-woven textiles.

9. A method of manufacturing a bioremediation geocomposite article capable of remediating a liquid-contained contaminant comprising:
   forming a geotextile mat formed from woven or non-woven geotextile fibers, having a thickness of about 6 mm to about 200 mm and having upper and lower major surfaces, wherein the geotextile mat has void spaces between the geotextile fibers that receive organophilic clay and bacteria there between or absorbed therein;
   adding a powdered or granular organophilic clay containing a contaminant-digesting bacteria to said geotextile mat; and
   securing adjacent geotextile layers to said organophilic clay and bacteria-containing geotextile mat to secure the organophilic clay and bacteria-containing geotextile mat therebetween, wherein one of the surrounding geotextile layers is unfilled.

10. The method of claim 9, further including adding the powdered or granular organophilic clay and bacteria to an inner portion of the geotextile mat, said powdered or granular material filling a major portion of the geotextile mat within spaces between geotextile fibers of the mat.

11. The method of claim 9, further including the step of securing a liquid-permeable cover sheet to a lower major surface of the organophilic clay and bacteria-containing geotextile mat.

12. The method of claim 11, further including the step of filling a major portion of a pre-formed geotextile mat with the powdered or granular organophilic clay material and bacteria.

13. The method of claim 9, further including the step of covering edges of the geotextile mat with a sheet material layer.

14. The method of claim 13, wherein the edges of the geotextile mat are covered with excess material from one or two cover sheets.

15. The method of claim 14, wherein the excess material is secured together to cover the edges of the geotextile mat by adhesively securing the cover sheet over the edges of the geotextile, or heat-sealing the cover sheet together surrounding the edges of the geotextile.

16. The method of claim 12, wherein the organophilic clay and bacteria are caused to flow into the geotextile mat by vibrating the geotextile mat while in contact with the powdered or granular organophilic clay material and bacterie.

17. The method of claim 12, wherein the powdered or granular material contains a bacteria and the powdered or granular material is caused to flow into the geotextile mat by applying a vacuum to an undersurface of the geotextile mat to draw the powdered or granular material into the geotextile mat from an upper surface.

18. The method of claim 12 further including the step of providing a cover sheet, having a dimension larger than a major surface of the geotextile mat, to provide excess cover material so that the excess cover material extends over an edge surface of the geotextile mat, and securing the excess cover material to the geotextile mat to cover an edge surface, thereby reducing or eliminating escape of bacteria through the covered edge surface of the geotextile article.

19. The method of claim 18, including the step of covering all edge surfaces of the geotextile mat with excess cover material, and securing the excess cover material to the geotextile mat thereby reducing or eliminating escape of bacteria through all edge surfaces of the geotextile mat.

20. The method of claim 18, wherein the cover sheet is secured over the edge surface by an expedient selected from the group consisting of adhesively securing, needlepunching and ultrasonic welding.

21. The method of claim 19, wherein at least one of the cover sheets is secured over all edge surfaces by an expedient selected from the group consisting of adhesively securing, needlepunching, heat welding and ultrasonic welding.

22. The method of claim 9, wherein at least one of the geotextile layers surrounding the bacteria-containing geotextile layer has an apparent opening size in the range of about 0.5mm to about 6mm, and is at least partially filled with powdered or granular material.

23. The method of claim 22, further including the step of adhering a liquid-permeable cover sheet to an exposed major surface of at least one of the surrounding geotextile layer.

24. The method of claim 23, further including the step of adhering a liquid-permeable cover sheet to an exposed major surface of both of the surrounding geotextile layers.

25. The method of claim 22, wherein both surrounding geotextile layers are at least partially filled with a powdered or granular material, and wherein both surrounding geotextile layers have an apparent opening size in the range of about 0.5mm to about 6mm.

26. A method of manufacturing a bioremediation geocomposite article comprising:
   laying geotextile fibers in a layer onto a first geotextile fabric;
   needlepunching or heat melting the geotextile fiber layer to secure the geotextile fiber layer to said geotextile fabric;
   contacting the needlepunched geotextile fiber layer with an organophilic clay and a bacteria to dispose the organophilic clay and bacteria within the needlepunched fiber layer in an amount such that open area remains in the geotextile layer for bacteria expansion; and
   securing adjacent geotextile layers to said organophilic clay and bacteria-containing geotextile mat to secure the organophilic clay and bacteria-containing geotextile mat therebetween, wherein one of the surrounding geotextile layers is unfilled.

27. The method of claim 26 wherein the first geotextile fabric is a woven fabric and the second geotextile fabric is a non-woven fabric.

* * * * *

UNITED STATES PATENT AND TRADEMARK OFFICE
CERTIFICATE OF CORRECTION

| | | |
|---|---|---|
| PATENT NO. | : 7,419,593 B2 | Page 1 of 1 |
| APPLICATION NO. | : 11/221019 | |
| DATED | : September 2, 2008 | |
| INVENTOR(S) | : Trauger et al. | |

It is certified that error appears in the above-identified patent and that said Letters Patent is hereby corrected as shown below:

In the Claims:

At Column 17, line 62, "bioremediation" should be -- bioremediating --.

At Column 18, line 2, "there between" should be -- therebetween --.

At Column 20, line 19, "bioremediation" should be -- bioremediating --.

Signed and Sealed this
Third Day of May, 2011

David J. Kappos
*Director of the United States Patent and Trademark Office*